July 29, 1941.  W. O. LYTLE  2,251,144
PRODUCTION OF DECORATIVE GLASS
Filed April 14, 1938
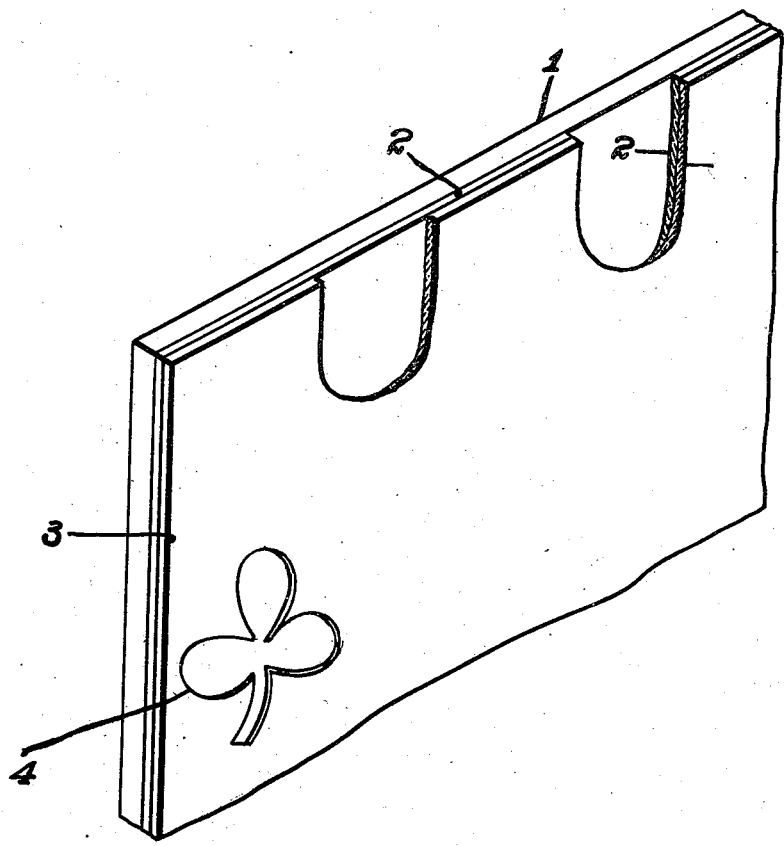
INVENTOR
WILLIAM O. LYTLE
BY Bradley & Bell
ATTORNEYS.

Patented July 29, 1941

2,251,144

UNITED STATES PATENT OFFICE 2,251,144

PRODUCTION OF DECORATIVE GLASS

William O. Lytle, New Kensington, Pa., assignor to Pittsburgh Plate Glass Company, Allegheny County, Pa., a corporation of Pennsylvania Application April 14, 1938, Serial No. 201,961

3 Claims. (Cl. 49—82)

The present invention relates to the production of decorative glass, and more particularly to a decorative glass having a double layer of glaze on one surface thereof.

The primary object of my invention is to provide an opaque glass having on one surface thereof layers of two differently colored glazes.

Another object of my invention is to provide a process of producing decorative glass having at least two different layers of glaze on one surface thereof which will appear as one color when viewed by reflected light and as a different color when viewed by transmitted light.

These and other objects and advantages of my invention will be more readily apparent from the following detailed description and the accompanying drawing, wherein:

The drawing is an isometric view of a decorated glass product produced according to my invention with the layers of glaze partially broken away to show the arrangement thereof.

Referring to the drawing, the numeral 1 indicates a body portion of glass formed by the usual practice of the art. To one surface of the glass, a colored glaze 2 is formed and another layer of glaze 3 of contrasting color is applied over layer 2 by methods which will be hereinafter described. An ornament or design 4 may be formed in the glazed surface of the product by partially removing a portion of the glazed surface 3. Any desired ornamental effect may be provided by cutting through the glaze 3 by any desired means, such as by sand-blasting, or etching the surfaces 3, and 2.

The present invention is based upon the discovery that an opaque glass having a decorative appearance and which appears as one color when viewed by reflected light and as another color when viewed by transmitted light may be produced by applying glazes of two different colors to one surface of a glass sheet.

A double layer of glaze may be suitably applied to a glass sheet by any one of three different processes, such as by enameling, by the drawing process, or by the rolling process.

According to the enameling process, the glass surface to be decorated may have the desired colors painted upon the surface. Such coloring matter may be easily scratched from the glass so that it is more desirable to utilize a more permanent method of enameling which consists in painting or printing the glass surface with a suitable glaze or enamel in the form of a slip, as before, and then drying the glass, and placing it in a suitable furnace and heating it for a short time to a red heat, and said operations are repeated to form a second layer of color, or two layers of color may be applied in one operation and the enamels fused by one firing operation. Colors so burnt into the glass surface are metallic oxides or salts, or in some cases the metals themselves, together with a suitable flux, such as may be obtained by fusing a mixture of sand, red lead, and borax. As a medium for applying the powdered enamel, a good varnish or lacquer is desirable to serve as a carrying medium for the powdered enamel. When the coloring agent is heated in the furnace it melts to form a true glaze on the surface of the glass. The following are some of the principal coloring agents which may be used:

Yellow-barium chromate, lead chromate, uranium compounds, or antimony-lead compound.

Red-basic lead chromate, or ferric oxide.

Brown-ferric oxide, with zinc, nickel, and cobalt oxides as toning agents.

Blue-cobalt oxide, toned by the oxides of aluminum, zinc or chromium.

Black-cobalt oxide with ferric oxide or manganese dioxide.

Green-copper oxide with potassium bichromate or chromic oxide with aluminum, cobalt, or iron oxides for toning.

White-stannic oxide, zirconium oxide, or finely-ground porcelain.

The enamels used may be of two classes, opaque coloring enamels, or transparent enamels. For the opaque enamels, suitable fluxes are: (1) Sand 30 parts, red lead 80 parts; or (2) Sand 40 parts, red lead 70 parts, borax 20 parts. For red, brown, and light blue colors the flux is generally first melted, cooled by pouring into water, and finely ground, and then mixed with the coloring agent in the proportion of about thirty of flux to one of color.

The colors mentioned above may be mixed to form any desired shade or blend of colors.

According to the second process mentioned above, the layers of glaze may be formed on the glass sheet by the drawing process in an ordinary sheet glass machine, such as that of Slingluff or Colburn. In this process, the coloring material in the form of colored glass in molten or powdered form is fed onto the surface of the bath adjacent the line of draw of the sheet, or, if desired, the coloring material may be applied to the surface of the glass sheet by the leer rollers as the sheet passes through a vertical leer. In such a case, the lower pair of leer rollers may be employed to apply a glaze of high melting point while an upper pair of leer rollers may be utilized to apply a second layer of glaze of colored material having a lower melting point than the melting point of said first-mentioned glaze.

According to the third process mentioned above, the layers of glaze may be formed on the glass sheet by the rolling process, such as is clearly described in United States Patent No. 1,529,947, to Ira H. Freese. In this process, the coloring material, preferably in several hoppers, is fed onto the molten surface of a glass sheet as it is passed through a horizontal leer. In such a case, the coloring material of different melting points is placed in the hoppers so that the high melting point glaze is applied first, and the low melting point glaze is applied second to the glass sheet.

The coloring matter utilized in the two above-described processes is ordinarily in the form of colored frit. This frit may be of various kinds, but is ordinarily a finely divided glazing material having a melting point of not more than about 1200° F. mixed with suitable coloring ingredients so that when fused, it forms a glaze or enamel which constitutes the surface layers of the glass sheet. This glaze is made up of ingredients proportioned so that the material after it is fused onto the glass sheet has substantially the same coefficient of expansion as the body of the glass sheet. It is preferably of granules of substantial size rather than dust, a dust-like material being objectionable because of its dissipation to the atmosphere during the feeding operation when the colored material is applied to the red-hot glass sheet.

An opaque glass having two layers of ornamental glaze of two different colors may be produced by any of the above-described processes and the body 1 may be made of opaque material by incorporating into the batch from which the glass is made suitable opacifying agents such as sodium silicon fluoride or fluorspar.

Various ornamental effects, such as the ornament 4 in the drawing, may be produced by placing any desired pattern over the outer layer of glaze 3 and removing a portion of such glaze by any suitable means, such as by etching or sand-blasting, to expose a portion of the surface of the inner layer of glaze 2, or if desired, the layer 2 may be removed to expose the surface of sheet 1. Also, when contrasting or blending colors are used to form the two different layers of glaze 2 and 3, it is possible to produce a glass which appears as one color when viewed by reflected light and as another color when viewed by transmitted light. Also, the glass product may be annealed, if desired.

The foregoing detailed description has been given for clearness of understanding only and no unnecessary limitations should be understood therefrom, but it should be construed as broadly as permissible in view of the prior art.

What I claim is:

1. A process of producing decorative glass which comprises distributing a uniform layer of unfused colored vitreous material of comparatively high melting point over one surface of a sheet of glass containing sufficient heat to fuse the added vitreous material, distributing a second uniform layer of unfused vitreous material of a different color and having a comparatively low melting point over the first layer of added vitreous material, while the coated sheet of glass retains sufficient heat to fuse the second layer, and completely cooling the doubly coated sheet of glass.

2. A process of producing decorative glass which comprises applying a layer of colored frit of comparatively high melting point to one surface of a newly formed glass sheet, containing sufficient residual heat to fuse the frit, and then applying immediately a second layer of colored frit of a lower melting point than that of the frit first applied to the sheet over said first-mentioned layer of colored frit while the sheet retains sufficient heat to fuse the second layer of frit.

3. A process as defined in claim 2, wherein the glass sheet to which the coating layers of frit are applied is produced as a continuous ribbon.

WILLIAM O. LYTLE.